April 7, 1925.                                                                              1,532,581
J. ELKINS
SAWMILL CARRIAGE WHEEL
Filed Sept. 29, 1924
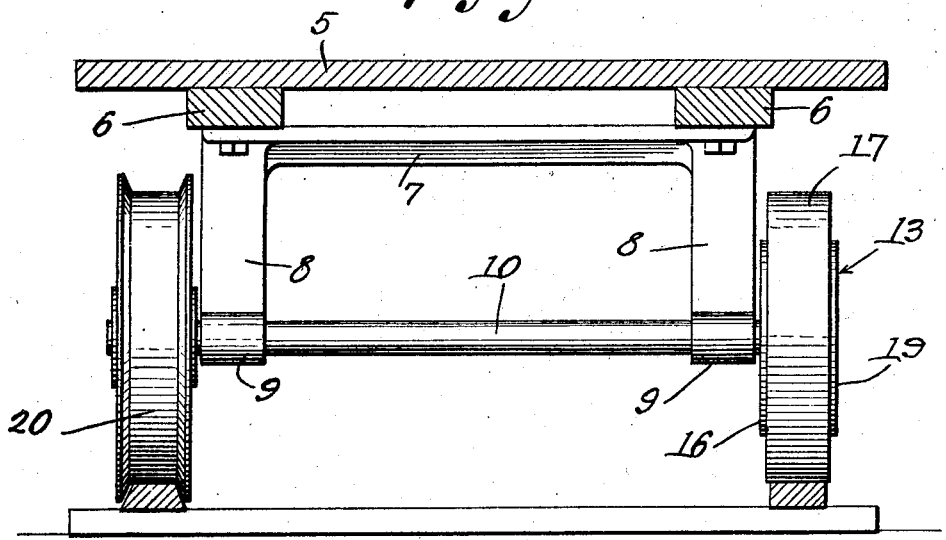
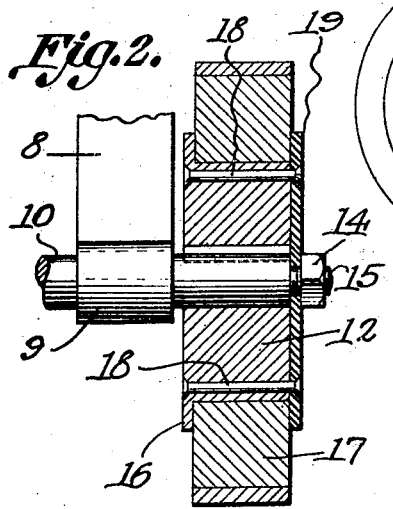
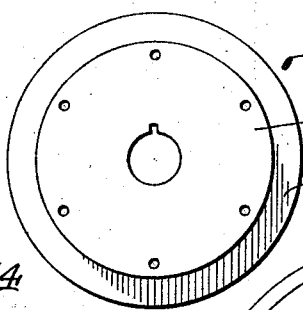
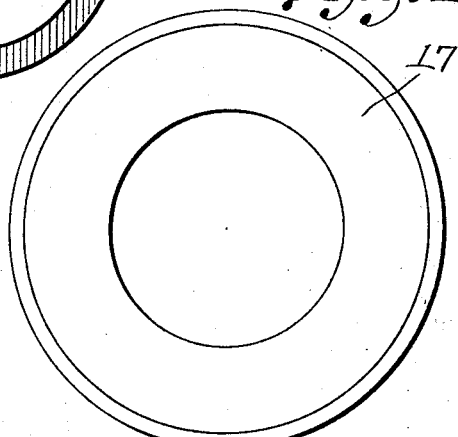
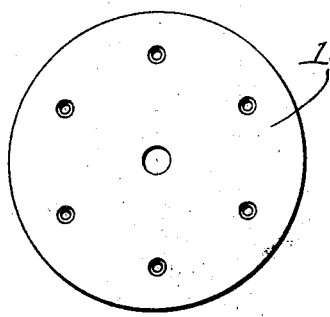
Inventor
J. Elkins
By C. A. Snow & Co
Attorney Patented Apr. 7, 1925.

1,532,581

UNITED STATES PATENT OFFICE.

JOSEPH ELKINS, OF BLYTHEVILLE, ARKANSAS.

SAWMILL-CARRIAGE WHEEL.

Application filed September 29, 1924. Serial No. 740,565.

*To all whom it may concern:*

Be it known that I, JOSEPH ELKINS, a citizen of the United States, residing at Blytheville, in the county of Mississippi and State of Arkansas, have invented a new and useful Sawmill-Carriage Wheel, of which the following is a specification.

This invention relates to saw mill carriage wheels, and aims to provide a novel form of wheel especially designed for use in connection with saw mill carriages to insure against skidding of the wheels on the track on which they operate, and at the same time reduce the friction between the wheels and track to the minimum.

Another object of the invention is to provide a device of this character including a novel manner of mounting the straight face wheels of the carriage.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 is a sectional view disclosing a saw mill carriage equipped with wheels constructed in accordance with the invention.

Figure 2 is a longitudinal sectional view through the wheel which is secured for rotation with the axle of the carriage.

Figure 3 is an elevational view disclosing the hub construction of the wheel.

Figure 4 is an elevational view of a wheel mounted at the opposite end of the axle and movable thereon.

Figure 5 is an elevational view of the securing disk employed for securing the elements of the wheel together.

Referring to the drawing in detail, the reference character 5 indicates the carriage which is of the usual construction and which includes spaced parallel side bars 6. Bolted to the bars 6 is a bar 7 that has integral depending arms 8 formed with bearings 9 at their lower ends, in which bearings is mounted the axle 10 on which the wheels, which form the essence of the present invention are mounted. The wheel which is mounted to revolve with the axle 10 includes a hub section 12 which is keyed to the axle 10 by means of the key 11.

As shown, the hub section 12 is secured by means of the nut 14 which is mounted on the threaded extension 15 of the axle 10. The hub 12 is also formed with a flange 16 against which the outer section 17 of the wheel moves, the flange acting to hold the outer section 17 in position on the hub section 12. Bolts 18 extend through the hub section 12 and also pass through openings in the disk 19 which engages the outer surface of the outer section 17 of the wheel to cooperate with the flange 16 in securing the outer section 17 into position.

Thus it will be seen that the wheel, or outer section 17 thereof will operate freely on the hub section 12. At the opposite end of the axle 10 is a grooved wheel 20 which is of the usual type, and is supported to revolve on the axle 10.

It has been found in practice that the grooved wheel of a saw mill carriage will not wear as fast as the straight-faced wheel to the end that skidding of the carriage is produced when the carriage is moving along its track. In order to compensate for such wear, it has been found that by reducing the friction between the periphery of the wheel and the jack, the skidding will be eliminated.

I claim:—

1. In a saw mill carriage, an axle, a wheel having a grooved periphery mounted to rotate on the axle, a wheel on the opposite end of the axle, the last mentioned wheel including a hub section secured to the axle to move therewith, and a removable outer section mounted on the hub section and adapted to revolve around the hub section.

2. In a saw mill carriage, an axle, a wheel loosely mounted on one end of the axle, a wheel including a hub section keyed to the opposite end of the axle, said hub section having a flange, an outer wheel section mounted on the hub section to revolve therearound, and means secured to the hub section and engaging the outer wheel section for securing the outer wheel section into position.

In testimony that I claim the foregoing as my own, I have hereto affixed my signature in the presence of two witnesses.

JOSEPH ELKINS.

Witnesses:
B. J. ALLEN,
C. N. HAWKINS.